United States Patent [19]

Oberg

[11] 3,946,963
[45] Mar. 30, 1976

[54] DRAG ASSEMBLY FOR SPINNING REELS WITH FIXED INDICATOR BEZEL

[75] Inventor: Gary R. Oberg, Spirit Lake, Iowa

[73] Assignee: Berkley & Company, Inc., Spirit Lake, Iowa

[22] Filed: Aug. 1, 1974

[21] Appl. No.: 493,984

[52] U.S. Cl. .................... 242/84.21 R; 242/84.51 A
[51] Int. Cl.² ......................................... A01K 89/00
[58] Field of Search ....... 242/84.21 R, 84.2 G, 84.5, 242/84.5 A, 84.51, 84.51 A, 84.2 R

[56] References Cited
UNITED STATES PATENTS

| | | | |
|---|---|---|---|
| 2,711,292 | 6/1955 | Taggart et al. | 242/84.21 A |
| 2,734,693 | 2/1956 | Rabezzana | 242/84.21 R |
| 2,773,654 | 12/1956 | Hubner | 242/84.21 R |
| 2,773,655 | 12/1956 | Mandolf | 242/84.21 R |
| 3,284,019 | 11/1966 | Wood | 242/84.21 A |

Primary Examiner—Edward J. McCarthy
Attorney, Agent, or Firm—Orrin M. Haugen

[57] ABSTRACT

An open-face spinning reel having a conventional line spool assembly, spool cap means, and line bail means, the reel structure being further provided with an adjustable drag mechanism for controllably adjusting the rotation of the line spool upon the spindle shaft. The drag assembly includes an indicator bezel which is arcuately fixed to the spindle shaft. A drag adjustment knob means threadedly engaged upon the spindle shaft applies a drag force against the indicator bezel and the drag assembly, the adjustment knob means having indicia cooperatively arranged with indicia on the indicator bezel so as to provide for an absolute indication of the force being applied to the drag assembly and accordingly the amount of frictional force resisting free rotation of the line spool.

9 Claims, 11 Drawing Figures

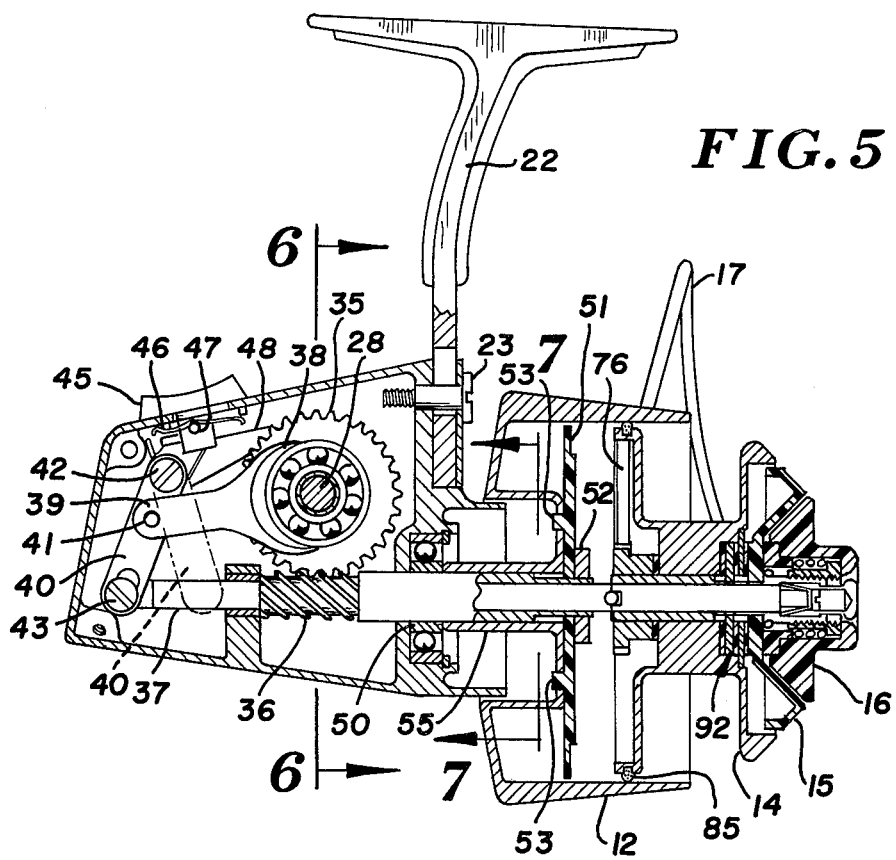
FIG. 5
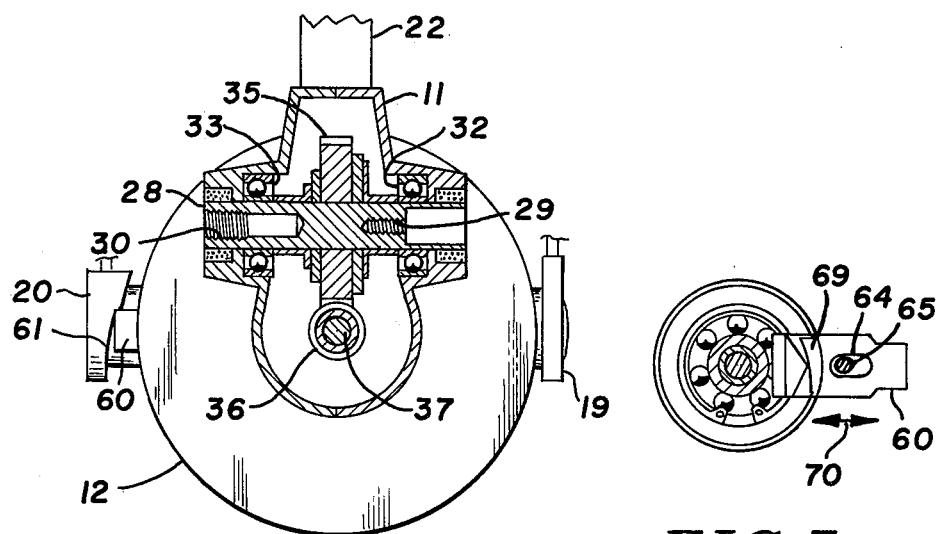
FIG. 6
FIG. 7

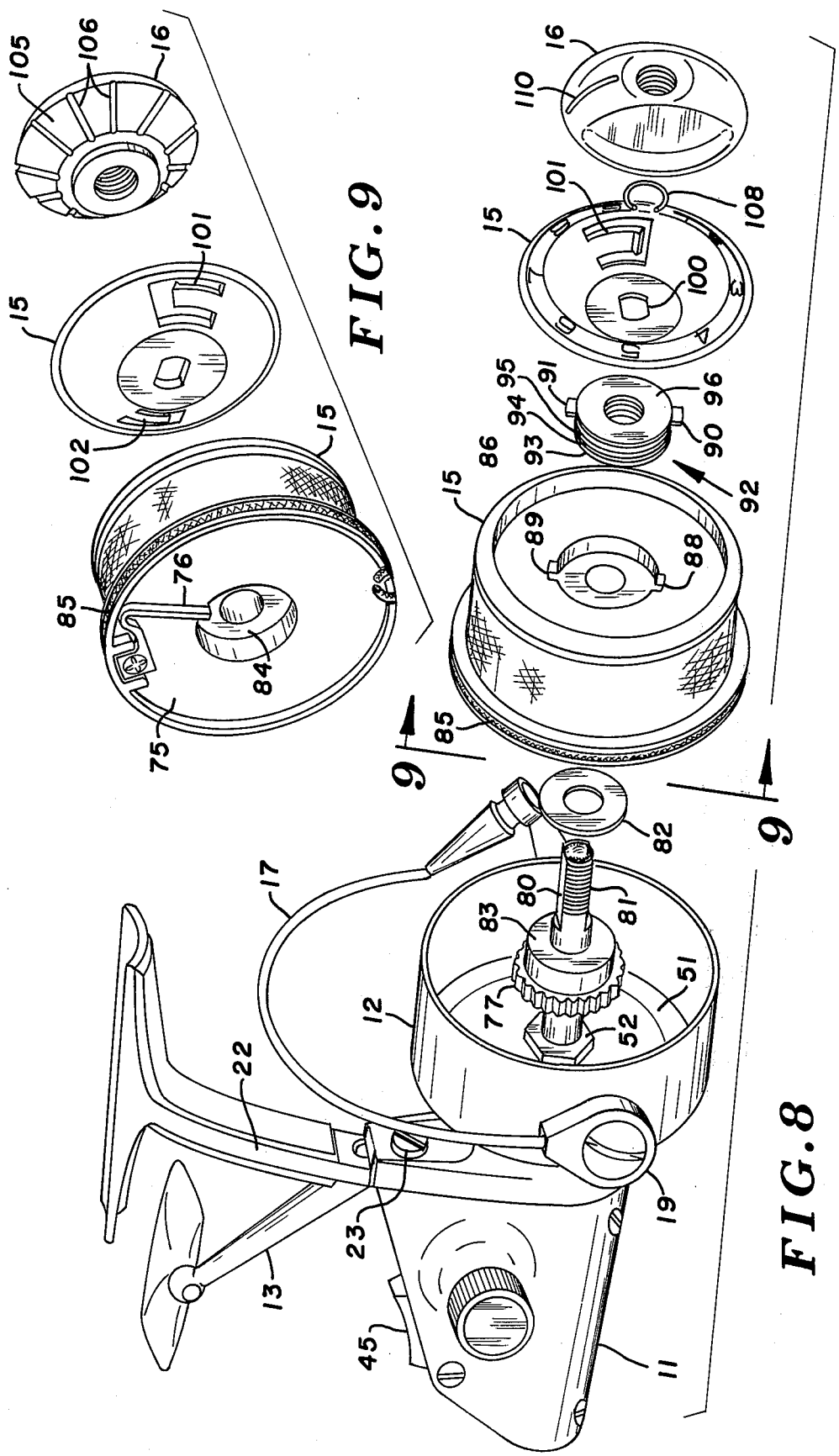

DRAG ASSEMBLY FOR SPINNING REELS WITH FIXED INDICATOR BEZEL

BACKGROUND OF THE INVENTION

The present invention relates generally to an improved spinning reel, and more particularly to an improved drag arrangement for an open-face spinning reel structure.

Traditionally, open-face spinning reels are provided with a line spool which is mounted on a spindle shaft and arranged for rotation thereabout. A drag assembly is provided for controllably resisting the free rotation of the line spool upon the spindle shaft, and a drag adjustment knob is normally provided to adjust the magnitude of the force applied to the drag assembly, and thus the resistance to free rotation of the line spool upon the spindle shaft. In the ordinary spinning reels, the drag adjustment knob may be pre-set to a desired position on the spindle shaft, however this absolute disposition is frequently lost as soon as relative rotation occurs between the drag adjustment knob and the face of the line spool. Therefore, once the fisherman has calibrated the force available for a particular drag knob adjustment setting, he is not able to quickly alter this setting to achieve a different drag adjustment. This is due to the fact that an absolute indicator is unavailable on the face of the reel, and hence any re-adjustment must be undertaken primarily by emperical means. The drag assembly means of the present invention provides a system wherein the fisherman may modify the drag setting in a controllable fashion, and upon modification of the setting, achieve a reasonable degree of certainty as to the absolute frictional force necessary to rotate the line spool on the spindle shaft.

SUMMARY OF THE INVENTION

Specifically, in accordance with the present invention, a stationary indicator bezel is provided at the forward face of the line spool, with the indicator bezel being locked against rotation relative to the spindle shaft. The outer face of the indicator bezel is provided with numerical indicia, this indicia being disposed radially outwardly of the axis of the spindle shaft and indicating various arcuate spacings. The drag adjustment knob is provided with a radially extending indicator line which will be directed to a certain numerical indicia disposed on the face of the indicator bezel. This indicator line and numerical indicia thereby provide the fisherman with sufficient information to establish the drag setting by visual indication. Any change in the drag setting will convey information to the fisherman as to the increase or decrease in the drag force, thus rendering the drag forces capable of being calibrated visually.

Therefore, it is a primary object of the present invention to provide an improved drag assembly for spinning reels, wherein the fisherman may be provided with a visual indication of the immediate disposition of the drag adjustment setting.

It is yet a further object of the present invention to provide an improved drag adjustment assembly for open-face spinning reels wherein a bezel indicator is disposed at the forward spool flange, and is arranged to mate with and lockingly engage the drag adjustment knob at any of a number of arcuately spaced dispositions.

It is yet a further object of the present invention to provide an improved drag assembly for spinning reels wherein the magnitude of the force being applied to the drag assembly, and in turn, the frictional forces resisting free rotation of the line spool, are readily visually indicated.

Other and further objects of the present invention will become apparent to those skilled in the art upon a study of the following specification, appended claims, and accompanying drawings.

BRIEF DESCRIPTION OF THE DRAWINGS

FIG. 5 is a vertical sectional view taken along the line and in the direction of the arrows 5—5 of FIG. 4;

FIG. 6 is a vertical sectional view taken along the line and in the direction of the arrows 6—6 of FIG. 5;

FIG. 7 is a detail sectional view of the camming ramp and bail release pin employed in the reel structure, FIG. 7 being taken generally along the line and in the direction of the arrows 7—7 of FIG. 5;

FIG. 8 is an exploded perspective view of the structure of the present invention, and illustrating the main reel frame intact, and showing the line spool, drag assembly, indicator bezel, and drag adjustment knob in exploded disposition;

FIG. 9 is a perspective view of those exploded components from FIG. 8, with FIG. 9 illustrating the rear surfaces of each of these components, and being taken generally along the line and in the direction of the arrows 9—9 of FIG. 8;

DESCRIPTION OF THE PREFERRED EMBODIMENT

Figure 1:
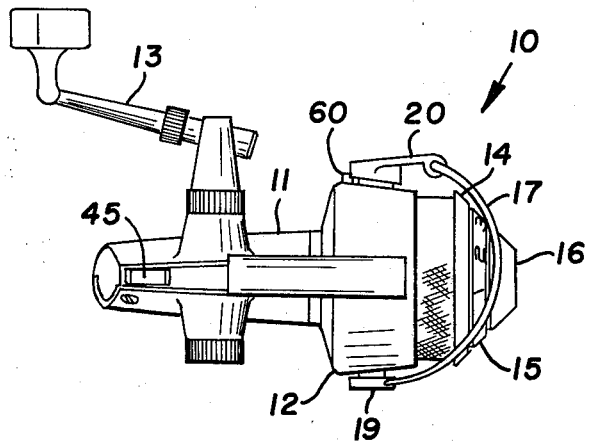
FIG. 1 is a top plan view of an open-face spinning reel structure equipped with the drag assembly of the present invention.

In accordance with the preferred embodiment of the present invention, the spinning reel structure generally designated 10 includes a frame means 11, a rotor 12, and a winding crank 13. A line spool is shown at 14, together with an indicator bezel 15 and drag knob 16. Line winding bail 17 is provided, with bail 17 being arranged for arcuate rotation about an axis extending between bail ends 19 and 20 respectively. A mounting foot and post for attachment of the reel to the fishing rod is illustrated at 22, with the post being adjustably received within frame 11 by locking screw 23. Adjustment is achieved by virtue of the slot formed in the end portion of mounting foot and post 22, as is illustrated in detail in FIG. 5.

Figure 2:
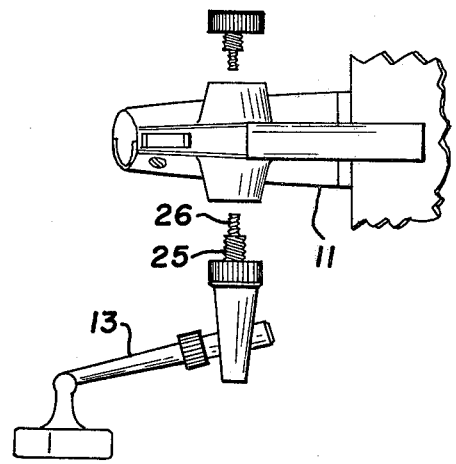
FIG. 2 is a detail top plan view of the spinning reel structure shown in FIG. 1, partially broken away, and partially in exploded disposition, and illustrating the manner in which the drive crank may be reversed from right-hand to left-hand drive.
Figure 3:
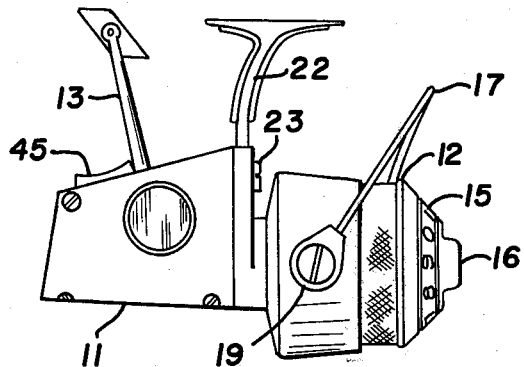
FIG. 3 is a side elevational view of the structure illustrated in FIG. 1.
Figure 4:
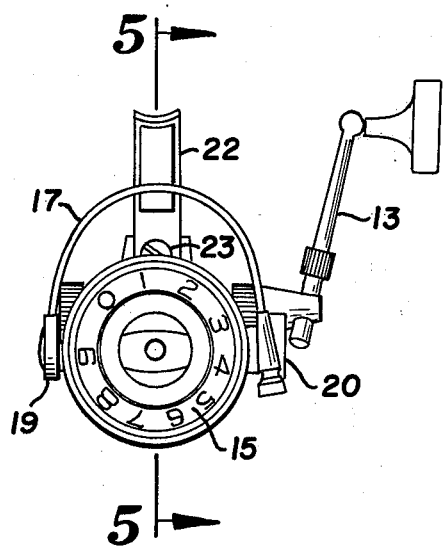
FIG. 4 is a front elevational view of the structure of FIG. 1.

The operation of the line winding means is, of course, conventional. For purposes of convenience, crank 13 may be engaged with the winding mechanism from either the right-hand or left-hand side, as illustrated in FIGS. 2 and 6. The crank 13 is provided with a dual set of drive threads, such as the left-hand threaded portion 25 and the right-hand threaded portion 26. As is apparent in FIG. 6, the drive shaft 28 which is coupled to crank 13 may be engaged by corresponding right-hand thread drive 29 or left-hand drive 30. Also, as is conventional, shaft 28 is arranged for rotation within housing frame 11 by suitable bearings 32 and 33.

As has been previously indicated, the main drive features of the spinning reel are essentially conventional. With attention being directed to FIG. 5, it will be seen that main drive shaft 28 has helical gear 35 secured thereto in pressed-on relationship, with helical gear 35 being meshed with rotor drive gear 36. Drive gear 36 is in the form of a sleeve, the core of the sleeve being coaxial with spindle shaft 37.

In order to achieve reciprocatory stroking of the spindle shaft, eccentric 38 in the form of a cam is provided, with crank arm 39 being arranged cooperatively therewith. Eccentric cam 38 thereby provides reciprocatory motion for crank arm 39, which is pivotally mounted to stroking arm 40 by pivotal mounting pin 41. Arm 40 is pivotally mounted to frame 11 by screw 42, with the arm 40 being adapted for pivotal rotation about the axis of screw 42. The extent of the throw or stroke of the spindle shaft 37 is thereby achieved by virtue of pivotal mount 43 at the lower end thereof, the phantom showing of arm 40 indicating the extent of the throw of the spindle shaft 37. Anti-reverse button 45 is provided, with the operation of this anti-reverse mechanism being conventional. Briefly, however, spring 46 is provided for lockingly engaging cross pin 47, thereby retaining anti-reverse button 45 in predetermined disposition. A pawl 48 is provided for engagement with helical drive gear 35.

Figures 10, 11:
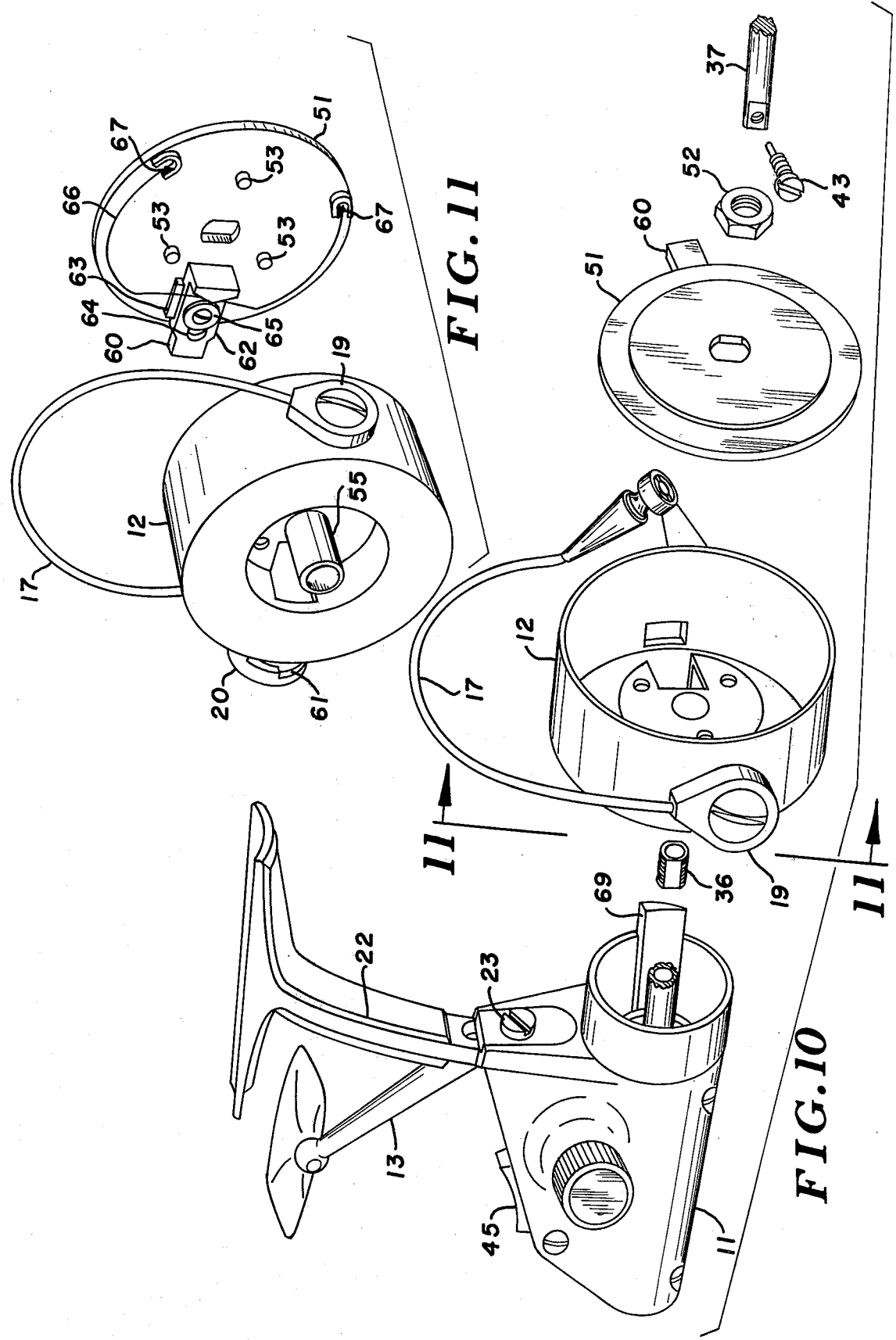
FIG. 10 is an exploded perspective view illustrating the drive housing intact, and with the rotor drum and the bail release pin components in exploded disposition therefrom, with those components previously shown in exploded disposition in FIG. 8 having been removed from this figure.
FIG. 11 is a perspective view showing the rear surfaces of those components illustrated in exploded disposition in FIG. 10, with this figure being taken along the line and in the direction of the arrows 11—11 of FIG. 10.

Helical drive sleeve or gear 36 is mounted for rotation within frame housing 11 by bearing 50, with the outer free end of member 36 having a flat portion thereon for engaging drive disc 51. Drive disc 51 is held in place on sleeve or gear 36 by nut 52, with drum drive pegs 53—53 being provided to engage drum or rotor 12, as illustrated in FIGS. 5 and 11. Therefore, rotation of helical drive sleeve 36 will cause rotation of drive disc 51, which, in turn, will rotatably drive drum or rotor 12. Drum 12 is provided with a hollow mounting sleeve 55 which is arranged to fit over the outer diameter of the extension of drive sleeve 36. This arrangement is illustrated in detail in FIG. 5.

As has been indicated, bail 17 is mounted for conventional pivotal rotation about the axis extending between members 19 and 20. Winding bail 17 functions normally, and is retracted or placed in casting disposition by arcuately pivoting the bail out of engagement with the line held on and filling line spool 14. In order to retain bail 17 in casting disposition, and to provide for semi-automatic return of bail to take-up or line retrieval mode, locking plunger 60 (FIG. 1) is provided which engages bail release staging cam 61 (FIG. 11). With continued attention being directed to FIG. 11, it will be seen that plunger 60 has a body portion 62 which is mounted for reciprocatory motion within guide 63. Slot 64 permits motion of body 62 relative to hold-down screw 65. A bail release follower spring 66 is provided which is locked with drag disc 51, as indicated, by heat melting or other suitable retention means, such as illustrated at 67. It will be appreciated that bail release follower spring 66 biases member 62 radially outwardly, and thus achieves a normal radial outward disposition. Upon being held within the confines of bail release staging cam 61, however, member 62 is retained so as to lockingly engage bail 17 in retracted or casting mode. Initial rotation of drum or rotor 12 releases the pin or plunger 60 from the bail release staging cam zone 61, radial inward thrust of member 62 being achieved by camming ramp 69 illustrated in FIG. 10. Further details of this release mode are illustrated in FIG. 7 wherein ramp 69 is illustrated and showing the radial inward force being applied to member 62. The double arrow 70 is intended to illustrate the radial travel of member 62 during this operation.

Turning now to the details of the line spool and its drag assembly, attention is now directed to FIGS. 8 and 9. In this arrangement, it will be seen that the rear surface 75 of line spool 14 is provided with a ratchet pick 76 mounted for engagement on gear 77. The operation of this ratchet pick is similar to that of known devices, and provides an audible indication to the fisherman that the line spool is moving relative to the spindle shaft. Spindle shaft 37 is provided with a pair of flat portions 80 and 81 adjacent the outer free end thereof, with these flat zones providing a locking surface for the individual components which are to be arcuately fixed to the spindle shaft.

In the assembly of the exploded components illustrated in FIG. 8, acetal resin washer 82 is disposed between the abutment surface 83 of gear 77, normally pressfit upon spindle shaft 37, to provide an interface between this stationary surface and the shoulder surface 84 disposed on the inner confines of spool 14 (FIG. 9). Duster wick 85 is utilized to prevent fishing line from entering the inner chamber of rotor or drum 12. Adjacent the outer flange 86, a pair of recesses are formed, the inner recess 87 being provided with a pair of arcuately spaced notches 88 and 89 for ultimate engagement with the ears 90 and 91 of the clutch-disc assembly shown in exploded disposition in FIG. 8. Clutch-disc assembly shown in FIG. 8 is generally designated 92, and includes a washer 93, prepared from acetal resin derived by polymerization of formaldehyde, along with a bronze or other metallic washer 94 arranged for locking engagement with the flat portions 80 and 81 of spindle shaft 37. A second acetal washer is interposed as at 95 to separate members 93 and 94, one from another by a smooth frictional surface such as is available from these surfaces. An outer acetal disc is provided as at 96. This arrangement of components is further illustrated in FIG. 5 in section, and reference is made to that drawing for an illustration of the stacking arrangement.

Acetal resin washers of the composition ($-OCH_2-$) derived by polymerization of formaldehyde are commercially available under the mark "Delrin" of E. I. DuPont deNemours Corp. of Wilmington, Delaware. As a suitable alternate, polytetrafluoroethylene washers may also be employed, this material likewise being commercially available under the mark "Teflon."

Indicator bezel means 15 is shown in detail in FIG. 8, with the core 100 of bezel 15 having flat portions thereon for engaging the flat portions 80 and 81 of spindle shaft 37. Furthermore, bezel 15 is provided with detent pawls 101 and 102 which are adapted to engage corresponding or mating detents in drag adjustment knob 16, such as is illustrated in the rear surface 105 of drag adjustment knob 16, particularly at 106—106. It will be appreciated, therefore, that the disposition of drag adjustment knob 16 on indicator bezel 15 may be fixed and maintained by the mating contact between detent pawls 101 and 102 of bezel 15, and the knob detents 106—106 of drag adjustment knob 16. The entire drag assembly is held in position by locking ring 108, with drag adjustment knob 16 being threadedly engaged upon the outer free end of spindle shaft 37. Indicator indicia in the form of numerical figures are illustrated on the front face of bezel 15, and a corresponding indicator groove or radially extending pointer 110 is illustrated on drag adjustment knob 16. In this fashion, therefore, a fisherman may initially calibrate the drag adjustment setting of his fishing reel and retain this calibration during normal periods of use. Adjustments upwardly or downwardly in the drag adjustment setting may be made with the knowledge that a single rotational click (from detent pawl and knob detents), will provide a predetermined increase or decrease in the drag adjustment setting.

I claim:

1. An open-face spinning reel structure comprising, in combination, frame means, a spindle shaft operatively coupled to said frame means, a line spool assembly including a line spool mounted on said spindle shaft and a spool cap rotor means having a generally open end and being mounted for rotation upon said frame means, line bail means secured to said spool cap rotor means, and drive means mounted on said frame means including main drive gear means for rotating said spool cap rotor and linkage means for reciprocatorily moving said spindle shaft along the axis of said spool cap rotor, said line spool being mounted for rotation upon said spindle shaft with drag assembly means being disposed along said spindle shaft and having means frictionally engaging said line spool for controllably and adjustably accommodating rotation of said line spool upon said spindle shaft;

a. said drag assembly comprising first and second drag means having first and second mutually abutting drag surfaces respectively, with one of said drag means being arranged for rotation with said line spool and with the other being arcuately fixed to said spindle shaft;
   b. indicator bezel means arcuately fixed to said spindle shaft and disposed on said spindle shaft outwardly of said first and second drag means and having axially flexible and forwardly projecting pawl means on the forward surface thereof, and drag adjustment knob means threadedly engaged upon said spindle shaft and having locking detent means complementary to said indicator bezel projecting pawl means and arranged for receiving said pawl means in operative engagement therewith at spaced arcuate dispositions, said indicator bezel having arcuately spaced indicia displayed thereon, and said drag adjustment knob having indicia thereon complementary to said arcuately spaced indicia for indicating the immediate relative dispositions thereof.

2. The open-face spinning reel structure as defined in claim 1 being particularly characterized in that said indicator bezel means is mounted for relative axial movement in response to the axial disposition of said drag adjustment knob to apply compressive axial forces against said first and second drag means.

3. The open-face spinning reel structure as defined in claim 1 being particularly characterized in that said line spool has an outer spool flange provided with a recess therein, and wherein the outer diameter of said indicator bezel fits within said recess.

4. The open-face spinning reel structure as defined in claim 3 particularly characterized in that said spindle shaft has a flat portion formed thereon extending across a substantial arcuate extent of said spindle shaft, and said first drag means has a portion formed complementary thereto to be locked against relative arcuate rotation with said spindle shaft.

5. The open-face spinning reel structure as defined in claim 4 being particularly characterized in that said forward line spool recess has a pair of arcuately spaced notches formed therein and said second drag means has a pair of arcuately extending ears formed complementary thereto for locking engagement within said arcuately spaced notches.

6. The open-face spinning reel structure as defined in claim 1 being particularly characterized in that the locking means on said indicator bezel is a pair of detent engaging forwardly projecting pawls are disposed at generally 180° opposed relationship on the forward surface of said indicator bezel.

7. The open-face spinning reel structure as defined in claim 5 being particularly characterized in that the rear surface of said indicator bezel is in engagement with the forward surface of said second drag means.

8. The open-face spinning reel structure as defined in claim 7 being particularly characterized in that washer means are fabricated from a synthetic resin selected from the group consisting of acetal resin and polytetrafluoroethylene, and wherein said washers are interposed between each relatively movable surface of said drag means.

9. The open-face spinning reel structure as defined in claim 1 being particularly characterized in that said locking pawl engages said locking detent means with a responsive click.

\* \* \* \* \*